US012097911B2

(12) United States Patent
Ooba et al.

(10) Patent No.: US 12,097,911 B2
(45) Date of Patent: Sep. 24, 2024

(54) STEERING SYSTEM AND VEHICLE EQUIPPED WITH SAME

(71) Applicant: NTN CORPORATION, Osaka (JP)

(72) Inventors: Hirokazu Ooba, Iwata (JP); Norio Ishihara, Iwata (JP); Satoshi Utsunomiya, Iwata (JP); Yusuke Ohata, Iwata (JP)

(73) Assignee: NTN CORPORATION, Osaka (JP)

( * ) Notice: Subject to any disclaimer, the term of this patent is extended or adjusted under 35 U.S.C. 154(b) by 948 days.

(21) Appl. No.: 17/032,176

(22) Filed: Sep. 25, 2020

(65) Prior Publication Data

US 2021/0009193 A1 Jan. 14, 2021

Related U.S. Application Data

(63) Continuation of application No. PCT/JP2019/012715, filed on Mar. 26, 2019.

(30) Foreign Application Priority Data

Mar. 27, 2018 (JP) ................................. 2018-059170

(51) Int. Cl.
   *B62D 5/04* (2006.01)
   *B62D 7/09* (2006.01)
(52) U.S. Cl.
   CPC ......... *B62D 5/0418* (2013.01); *B62D 5/0463* (2013.01); *B62D 7/09* (2013.01)
(58) Field of Classification Search
   CPC .... B62D 5/0418; B62D 5/0463; B62D 6/003; B62D 17/00; B60B 27/00; B60B 35/02;
   (Continued)

(56) References Cited

U.S. PATENT DOCUMENTS 6,778,889 B2   8/2004 Kato et al.
9,834,249 B2  12/2017 Ishikawa et al.
            (Continued)

FOREIGN PATENT DOCUMENTS

CN   102069843 A    5/2011
CN   102821985 A   12/2012
            (Continued)

OTHER PUBLICATIONS

English Translation for JP-2006175980-A (Year: 2006).*
(Continued)

*Primary Examiner* — Rachid Bendidi
*Assistant Examiner* — Moises Gasca Alva

(57) ABSTRACT

Provided is a steering system capable of enhancing traveling stability when a vehicle drives straight and improving small-turn performance. The steering system includes: a first steering device; a second steering device including a mechanical section configured to individually steer each of left and right wheels by driving a steering actuator and a control section configured to control the steering actuator; and a vehicle information detection section configured to detect a velocity of the vehicle and a steering angle. The control section includes a turning angle control module configured to control the steering actuator pursuant to a predetermined rule in accordance with the velocity of the vehicle and the steering angle so as to control turning angles of the left and right wheels.

6 Claims, 14 Drawing Sheets

(58) Field of Classification Search
CPC ............ B60G 2200/44; B60G 2206/50; B60G 2500/40
See application file for complete search history.

(56) References Cited

U.S. PATENT DOCUMENTS

| | | | |
|---|---|---|---|
| 10,023,228 | B2 | 7/2018 | Ohba et al. |
| 10,053,148 | B2 | 8/2018 | Auden |
| 10,668,950 | B2 | 6/2020 | Kurita et al. |
| 10,821,981 | B1* | 11/2020 | Funke ................ B62D 7/159 |
| 11,097,768 | B2 | 8/2021 | Ooba et al. |
| 2003/0009272 | A1 | 1/2003 | Kato et al. |
| 2008/0167778 | A1* | 7/2008 | Tsukasaki ............ B62D 5/0418 701/41 |
| 2008/0243339 | A1 | 10/2008 | Nishimori et al. |
| 2013/0153326 | A1 | 6/2013 | Yamamoto et al. |
| 2016/0236710 | A1 | 8/2016 | Ohba et al. |
| 2016/0280259 | A1 | 9/2016 | Ishikawa et al. |
| 2016/0362133 | A1 | 12/2016 | Auden |
| 2019/0016386 | A1 | 1/2019 | Kurita et al. |
| 2020/0122771 | A1 | 4/2020 | Ooba et al. |
| 2020/0290588 | A1* | 9/2020 | Källstrand ...... B60W 30/18145 |
| 2021/0001921 | A1 | 1/2021 | Ishihara et al. |

FOREIGN PATENT DOCUMENTS

| | | | |
|---|---|---|---|
| CN | 203094172 U | 7/2013 | |
| CN | 103895697 A | 7/2014 | |
| CN | 104908809 A | 9/2015 | |
| CN | 105579326 A | 5/2016 | |
| CN | 105658503 A | 6/2016 | |
| CN | 106240629 A | 12/2016 | |
| CN | 106335542 A | 1/2017 | |
| CN | 111867921 A | 10/2020 | |
| DE | 10 2012 206 337 A | 10/2013 | |
| EP | 2554408 A1 | 2/2013 | |
| EP | 3643584 A1 | 4/2020 | |
| EP | 3770040 A1 | 1/2021 | |
| JP | 2003-11840 | 1/2003 | |
| JP | 2005-138709 A | 6/2005 | |
| JP | 2005-349845 A | 12/2005 | |
| JP | 2006175980 A * | 7/2006 | |
| JP | 2007-62628 A | 3/2007 | |
| JP | 4230947 B | 2/2009 | |
| JP | 2009-113562 A | 5/2009 | |
| JP | 2009-226972 A | 10/2009 | |
| JP | 3158339 | 3/2010 | |
| JP | 2010-179678 A | 8/2010 | |
| JP | 2011-016429 A | 1/2011 | |
| JP | 2014-61744 A | 4/2014 | |
| JP | 5615094 B | 10/2014 | |
| JP | 2015-117005 A | 6/2015 | |
| JP | 2017-128151 A | 7/2017 | |
| JP | 2018-24284 A | 2/2018 | |
| JP | 2019-6226 | 1/2019 | |
| WO | WO-2010020844 A1 * | 2/2010 | ............ B62D 7/1581 |

OTHER PUBLICATIONS

Non-Final Office Action dated May 10, 2022 in U.S. Appl. No. 17/032,467.
Extended European Search and Supplementary Report dated Nov. 22, 2021 in European Patent Application No. 19775319.7.
Extended European Search and Supplementary Report dated Dec. 10, 2021 in European Patent Application No. 19778285.7.
Notice of Reasons for Refusal issued Jan. 4, 2022 in Japanese Patent Application No. 2018-059170.
International Preliminary Report on Patentability dated Oct. 8, 2020 in International Patent Application No. PCT/JP2019/012715.
First Office Action issued Feb. 25, 2022 in Chinese Patent Application No. 201980022150.3.
Notice of Reasons for Refusal issued Mar. 29, 2022 in Japanese Patent Application No. 2018-059174.
Japanese Office Action dated Sep. 6, 2022 in Japanese Patent Application No. 2018-059174 (2 pages; 2 pages English translation).
Chinese Office Action dated Sep. 20, 2022 in Chinese Patent Application No. 201980022150.3 (6 pages; 9 pages English translation).
Japanese Office Action dated Aug. 16, 2022 in Japanese Patent Application No. 2018-059170 (4 pages; 3 pages English translation).
U.S. Office Action dated Sep. 16, 2022 in U.S. Appl. No. 17/032,467, (15 pages).
First Office Action issued Feb. 16, 2022 in Chinese Patent Application No. 201980022347.7.
International Search Report dated Jun. 4, 2019 in International Patent Application No. PCT/JP2019/012728.
International Search Report date Jun. 25, 2019 in International Patent Application No. PCT/JP2019/012715.
U.S. Appl. No. 17/032,467, filed Sep. 25, 2020, Hirokazu Ooba, et al., NTN Corporation.

* cited by examiner

STEERING SYSTEM AND VEHICLE EQUIPPED WITH SAME

CROSS REFERENCE TO THE RELATED APPLICATION

This application is a continuation application, under 35 U.S.C. § 111(a), of international application No. PCT/JP2019/012715, filed Mar. 26, 2019, which is based on and claims Convention priority to Japanese patent application No. 2018-059170, filed Mar. 27, 2018, the entire disclosures of all of which are herein incorporated by reference as a part of this application.

BACKGROUND OF THE INVENTION

Field of the Invention

The present invention relates to a steering system and a vehicle including the same as well as to a technology for enabling a vehicle to turn in a small turning radius.

Description of Related Art

General vehicles such as automobiles include a steering wheel mechanically connected to a steering device, the steering device having opposite ends connected to respective left and right wheels through tie rods. Therefore, a turning angle of each of the left and right wheels is determined by an operation of the steering wheel in accordance with an initial setting. Known vehicle geometries include: (1) "parallel geometry" in which left and right wheels have the same turning angle; and (2) "Ackermann geometry" in which an inner wheel in turning is turned by a larger wheel angle than that of an outer wheel in turning so as to have a single center of turning.

The vehicle geometries influence traveling stability and safety. For example, Patent Documents 1 and 2 propose mechanisms that allow the steering geometries to be changed in accordance with travel conditions. In Patent Document 1, positions of a knuckle arm and a joint part are relatively changed so as to change the steering geometries. In Patent Document 2, two motors are used to allow both of a toe angle and a camber angle to be changed to arbitrary angles.

In Ackermann geometry, a difference in turning angles of the left and right wheels is set so that the respective wheels turn about a single common point so as to smoothly turn the vehicle on turning in a low-speed range where a negligible centrifugal force acts on the vehicle. In contrast, on turning in a high-speed range where a centrifugal force is not negligible, parallel geometry is preferred to Ackermann geometry, since it is desirable that the wheels generate a cornering force in a direction for counterbalancing the centrifugal force.

As mentioned above, since a steering device of a general vehicle is mechanically connected to wheels, the vehicle can usually assume only a single fixed steering geometry and is often configured in an intermediate geometry between Ackermann geometry and parallel geometry.

In order to reduce a minimum turning radius, it is necessary to increase an operation amount of a steering wheel so as to turn the wheels in a greater extent. However, the wheels have a limited maximum turning angle because wheel housings are limited in size due to a conflict with a space required for an engine or a transmission and thus interfere with the wheels.

Although the solutions proposed in Patent Documents 1 and 2 make it possible to change steering geometries, there are the following problems.

In Patent Document 1, positions of a knuckle arm and a joint are relatively changed so as to change the steering geometries. It is, however, extremely difficult to provide a motor actuator that can provide such a large force that the vehicle geometries can be changed in such parts due to space constraints. In addition, since a change made at this location would only cause a small change to the wheel angles, it is necessary to cause a large change, i.e., to greatly move the positions in order to obtain a large effect.

In Patent Document 2, use of two motors would not only increase costs because of the increased number of the motors, but also complicate control.

RELATED DOCUMENT

Patent Document

[Patent Document 1] JP Laid-open Patent Publication No. 2009-226972
[Patent Document 2] DE 102012206337 A1

In a vehicle including wheels mechanically connected to a steering device, toe angles of the wheels cannot be changed during driving. In addition, since the left and right wheels are mechanically connected to each other, the wheels cannot be arbitrarily steered in such a way that, for example, only one of the wheels is turned by an increased amount.

In order to turn a vehicle in the smaller turning radius, it is necessary to increase an operation amount of a steering wheel so as to turn the wheels in a greater extent. However, the wheels have a limited maximum turning angle because wheel housings are limited in size due to a conflict with a space required for an engine or a transmission and thus interfere with the tires.

A conventional mechanism having a supplementary turning function has a complicated structure in order to arbitrarily change a toe angle or a camber angle of a wheel of a vehicle. Also, since the mechanism includes a larger number of components, it is difficult to ensure rigidity, and, in order to ensure rigidity, the mechanism as a whole has an increased size and an increased weight.

SUMMARY OF THE INVENTION

An object of the present invention is to provide a steering system capable of enhancing traveling stability when a vehicle drives straight and improving small-turn performance as well as a vehicle including the same.

Hereinafter, the present invention will be described using reference numerals used in embodiments for the sake of convenience in order to facilitate understanding of the present invention.

A steering system 101 of the present invention is a steering system for a vehicle 100, the steering system including:

a first steering device 11 configured to steer wheels 9 of the vehicle 100 in accordance with a command of a steering amount outputted by a steering command device 200, 200A;

a second steering device 150 including a mechanical section 150a configured to individually steer each of the wheels 9, 9 on left and right sides by driving a steering actuator 5 disposed in a tire housing 105 of the vehicle 100, and a control section 150b configured to control the steering actuator 5; and a vehicle information detection section 110 configured to detect vehicle information including a velocity of the vehicle 100 and a steering angle of the first steering device, wherein the control section 150*b* includes a turning angle control module 37 configured to control the steering actuator 5 pursuant to a predetermined rule in accordance with the velocity of the vehicle 100 and the steering angle so as to control turning angles of the wheels 9, 9 on the left and right sides.

The predetermined rule is determined as, for example, a control rule using a map or an operation formula that defines a relationship between vehicle velocity, steering angle, and drive amount of the steering actuator (for example, driving current).

According to this configuration, the first steering device 11 is configured to steer the wheels in accordance with a command of a steering amount outputted by the steering command device 200, 200A. The steering command device 200, 200A may be, for example, a steering wheel operated by a driver or an automated steering command device. Such a steering command device can be used to adjust the direction of the vehicle 100 in the same manner as that in a conventional vehicle.

The second steering device 150 is configured to drive the steering actuator 5 disposed in the tire housing 105 so as to individually steer each of the left and right wheels 9, 9. In the control section 150*b* of the second steering device 150, the turning angle control module 37 can control the steering actuator 5 in accordance with the velocity of the vehicle 100 and the steering angle obtained from the vehicle information detection section 110 so as to, for example, slightly bring the wheels into a toe-in alignment when the vehicle is driving straight at high speed. This makes it possible to enhance traveling stability when the vehicle drives straight. The turning angle control module 37 can suitably adjust (or increase) the turning angles of the left and right wheels 9, 9 while the vehicle turns in accordance with travel conditions of the vehicle so as to improve small-turn performance of the vehicle.

In a vehicle having "Ackermann geometry," since an inner wheel in turning is turned by a larger wheel angle than that of an outer wheel in turning so as to have a single center of turning, interference between the wheel and the wheel housing (tire housing) occurs on the inner wheel side. Therefore, the outer wheel in turning can further be turned without changing the size of the tire housing, making it possible to reduce the minimum turning radius.

The turning angle control module may be configured to control the steering actuator such that only the outer wheel in turning of the wheels on the left and right sides is turned by an increased amount when the vehicle turns. In such a case, it is possible to turn the outer wheel in turning by an increased amount without changing the size of the tire housing as discussed above. Thus, it possible to reduce the minimum turning radius. Therefore, small-turn performance of the vehicle can be easily and reliably improved.

The mechanical section 150*a* of the second steering device 150 may include:

a hub unit main body 2 including a hub bearing 15 supporting each of the wheels 9;

a unit support member 3 provided to a chassis frame component 6 of a suspension device 12 and supporting the hub unit main body 2 so as to be rotatable about a turning axis A extending in a vertical direction; and the steering actuator 5 configured to rotationally drive the hub unit main body 2 about the turning axis A.

According to this configuration, the hub unit main body 2 including the hub bearing 15 supporting each of the wheels 9 can be freely rotated about the turning axis A in a certain range by driving the steering actuator 5. Thus, each of the wheels can be independently steered, and the toe angles of the wheels 9 can be arbitrarily changed in accordance with travel conditions of the vehicle 100.

It is also possible to change a difference of the turning angles of the left and right wheels 9, 9 in accordance with a driving speed during turning. For example, it is possible to change the steering geometries during driving so as to assume parallel geometry when turning in a high-speed range and Ackermann geometry when turning in a low-speed range. Thus, the wheel angles can be arbitrarily changed during driving so that the vehicle 100 can have improved motion performance so as to achieve stable and safe driving. Further, by suitably changing the turning angles of the left and right wheels to be steered, it is also possible to reduce a turning radius of the vehicle 100 during turning and to improve small-turn performance.

The control section 150*b* of the second steering device 150 may include a supplementary steering control section 151 configured to output a current command signal in accordance with a given steering angle command signal, and an actuator driving control section 31R, 31L configured to output a current in accordance with the current command signal inputted from the supplementary steering control section 151 so as to drive and control the steering actuator 5.

According to this configuration, the supplementary steering control section 151 is configured to output a current command signal in accordance with a given steering angle command signal. The actuator driving control section 31R, 31L is configured to output a current in accordance with the current command signal inputted from the supplementary steering control section 151 so as to drive and control the steering actuator 5. Thus, the wheel angles can be arbitrarily changed in addition to the steering performed by, e.g., an operation of the steering wheel by a driver.

The mechanical section 150*a* of the second steering device 150 may be configured to steer one or both of left and right front wheels 9, 9 and left and right rear wheels 9, 9. Where the mechanical section 150*a* is applied to the left and right front wheels 9, 9, the direction of the wheels 9 is steered along with the entire hub units in response to, e.g., an operation of the steering wheel by a driver, and in addition to the steering, each of the wheels can be independently turned by supplementary turning by a small angle. Where the mechanical section 150*a* is applied to the left and right rear wheels 9, 9, although the entire hub units are not steered, the supplementary turning function allows each of the wheels to be independently turned by a small angle in the same manner as the front wheels.

A vehicle of the present invention include a steering system having any of the above features. Therefore, the above-described effects of the steering system of the present invention can be obtained.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures, FIG. 1 schematically shows conceptual features of a steering system according to a first embodiment of the present invention;

DESCRIPTION OF THE EMBODIMENTS

First Embodiment

A first embodiment of the present invention will be described with reference to FIG. 1 to FIG. 14.

Figure 1:
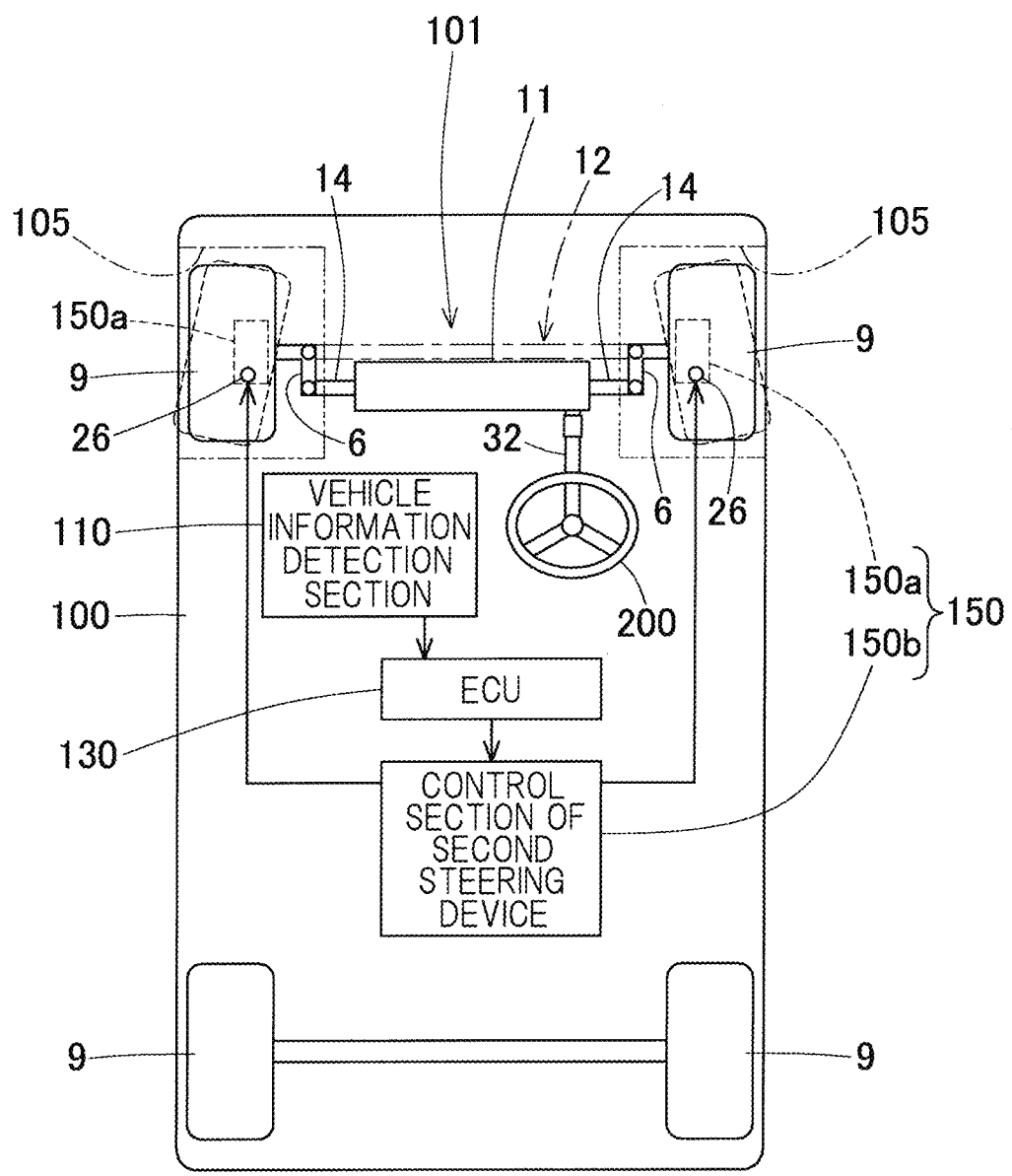

FIG. 1 schematically shows conceptual features of a vehicle 100 (such as an automobile) including a steering system 101 according to the present embodiment. The vehicle 100 may be a four-wheel vehicle including right and left front wheels 9, 9 and right and left rear wheels 9, 9. The vehicle may be any of a front-wheel drive vehicle, a rear-wheel drive vehicle, and a four-wheel drive vehicle.

The steering system 101 is a system for steering the vehicle 100 and includes a first steering device 11, a second steering device 150 that is a steering device for individually steering the left and right wheels 9, 9, and a vehicle information detection section 110.

The first steering device 11 is a device for steering the left and right wheels 9, 9 that are wheels of the vehicle 100 to be turned in response to an operation to a steering command device such as a steering wheel 200 from a driver. In the present embodiment, the first steering device is configured to steer the front wheels.

Figure 2:
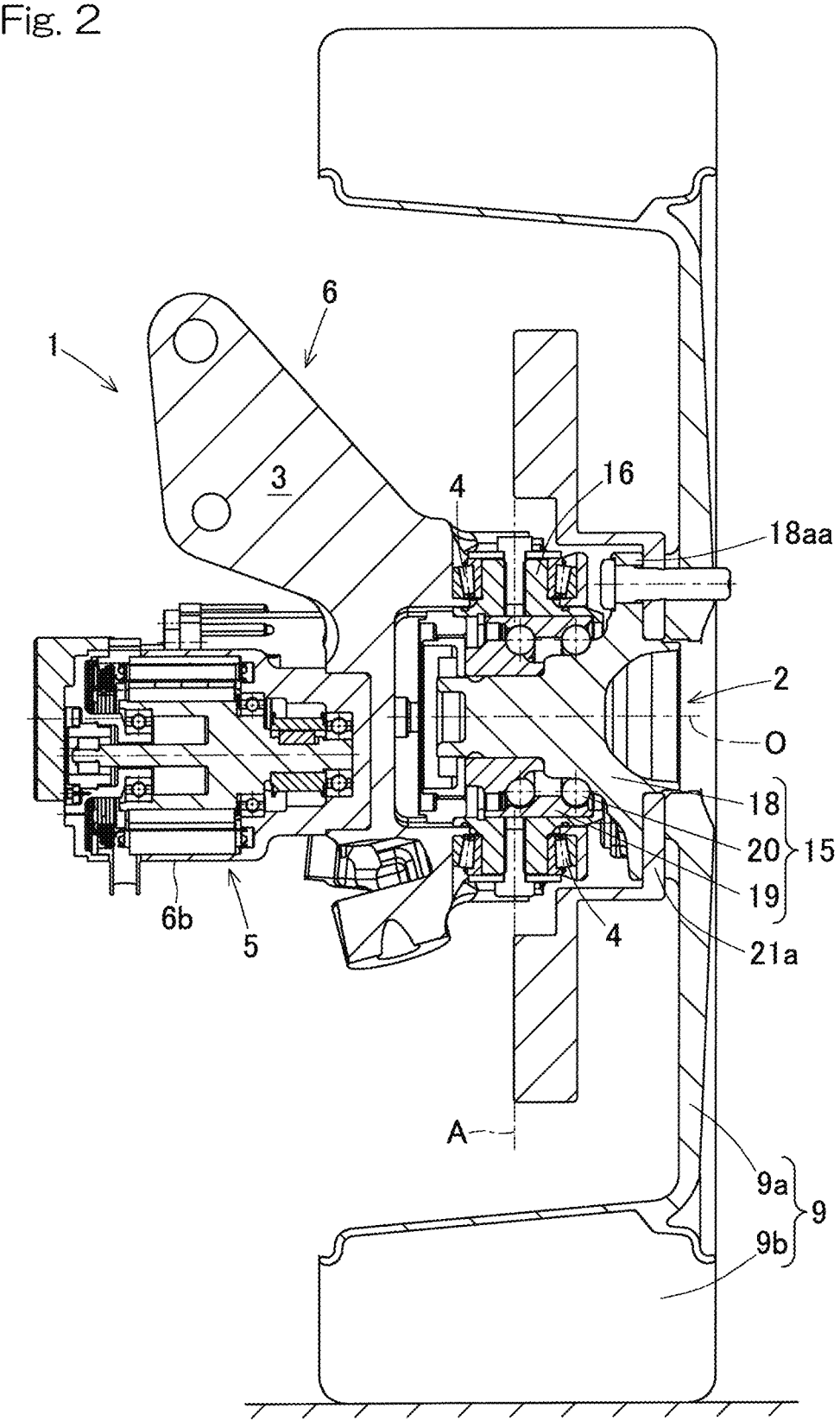
FIG. 2 is a longitudinal sectional view illustrating a mechanical section of a second steering device of the steering system in FIG. 1 and surrounding features thereof.

The second steering device 150 is a device for performing supplementary steering by a control in accordance with a state of the vehicle 100 and includes a mechanical section 150a and a control section 150b. The mechanical section 150a is a mechanism provided to each of the wheels 9, 9 that are subjected to supplementary turning. The mechanical section 150a is disposed in a tire housing 105 of the vehicle 100 and is configured to individually steer each wheel 9 by driving the steering actuator 5 (FIG. 2). The control section 150b performs a control on the basis of vehicle information indicating a state of the vehicle 100 detected by the vehicle information detection section 110.

In other words, the steering system 101 includes:
a first steering device 11 configured to change angles of knuckles 6, 6 that are left and right chassis frame components of a suspension device 12 to which left and right wheels 9, 9 that are front wheels of the vehicle 100 are mounted so as to steer the left and right wheels 9, 9 in accordance with a command of a steering amount outputted by the steering command device, the left and right wheels 9, 9 being mechanically associated with each other;
a second steering device 150 configured to drive a supplementary turning actuator (steering actuator 5 (FIG. 2)) provided to each of the left and right wheels 9, 9 to change angles of the wheels 9, 9 relative to the knuckles 6, 6 that are the chassis frame components and thereby individually steer the left and right wheels 9, 9; and
a vehicle information detection section 110 which will be described later.

The vehicle information detection section 110 detects a state of the vehicle 100 and refers to a group of various sensors. The vehicle information detected by the vehicle information detection section 110 is sent to the control section 150b of the second steering device 150 via a main ECU 130.

The ECU 130 is a control unit for performing a coordinated control or an integrated control of the entire vehicle 100 and may also be referred to as a VCU.

Features of First Steering Device 11

The first steering device 11 is a system for steering the left and right wheels 9, 9 that are the front wheels of the vehicle 100 in association with each other in response to an input to the steering wheel 200 by a driver and includes well-known mechanical features such as a steering shaft 32, a rack and pinion (not illustrated), and tie rods 14. When a driver performs a rotational input to the steering wheel 200, the steering shaft 32 also rotates in association therewith. As the steering shaft 32 rotates, the tie rods 14 connected to the steering shaft 32 through the rack and pinion move in a widthwise direction of the vehicle so as to change the direction of the wheels 9. Thus, the left and right wheels 9, 9 can be steered in association with each other.

Schematic Features of Second Steering Device 150

Figure 9:
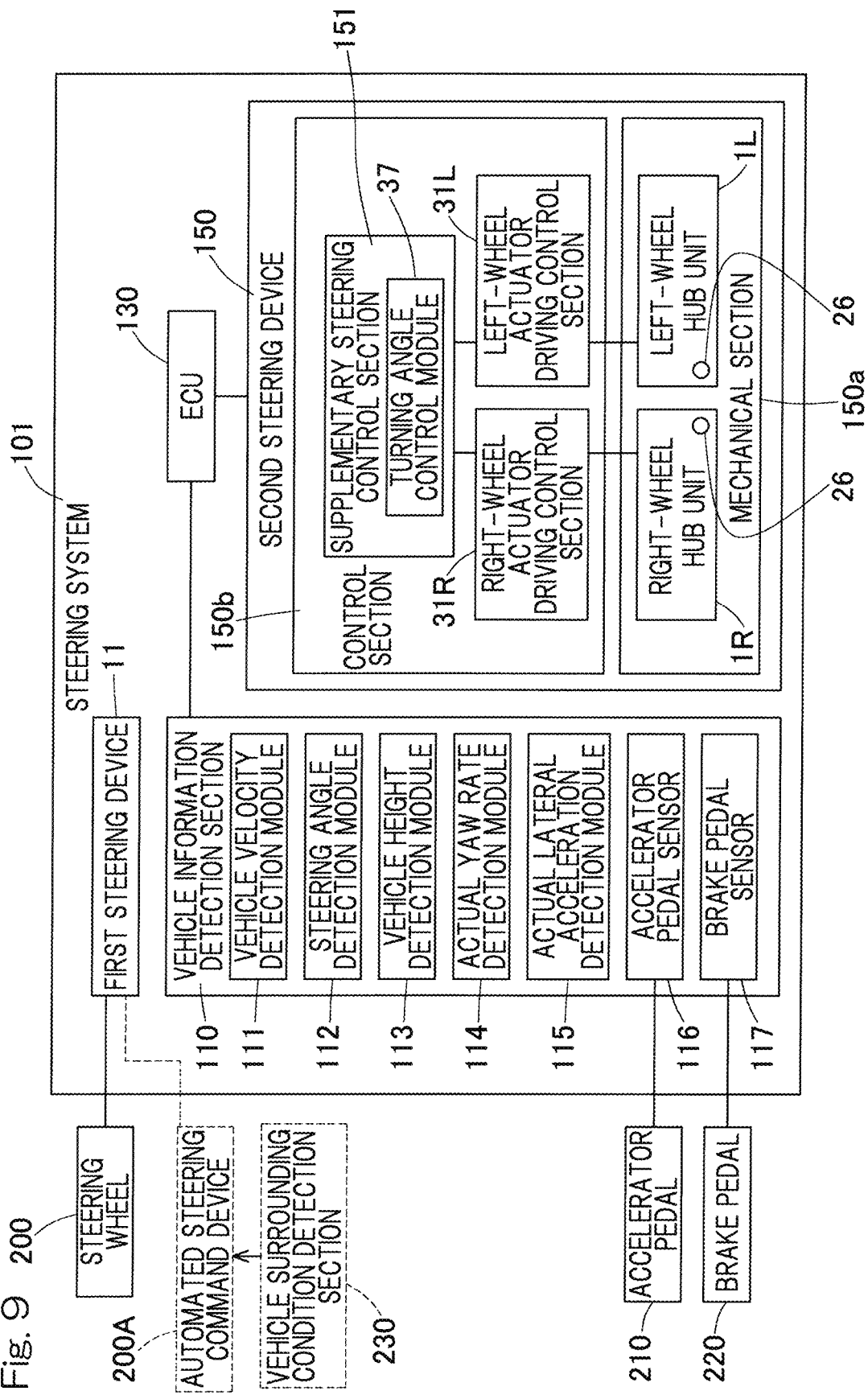
FIG. 9 is a block diagram illustrating conceptual features of the steering system in FIG. 1.

As shown in FIG. 1 and FIG. 9, the second steering device 150 can independently steer the left and right wheels 9, 9.

The mechanical section 150a of the second steering device 150 includes a right-wheel hub unit 1R and a left-wheel hub unit 1L. The right-wheel hub unit 1R and the left-wheel hub unit 1L are configured to steer the wheels 9, 9 by the steering actuators 5 (FIG. 2) disposed in the tire housings 105.

Examples of Specific Features of Mechanical Section 150a of Second Steering Device 150

As described above, the mechanical section 150a of the second steering device 150 includes the right-wheel hub unit 1R and the left-wheel hub unit 1L, and each of the right-wheel hub unit 1R and the left-wheel hub unit 1L is configured as a steering function-equipped hub unit 1 as shown in FIG. 2. As is also shown in FIG. 2, the hub unit 1 includes a hub unit main body 2, a unit support member 3, rotation-permitting support components 4, and a steering actuator 5. The unit support member 3 is integrally provided to the knuckle 6 that is the chassis frame component.

Figure 3:
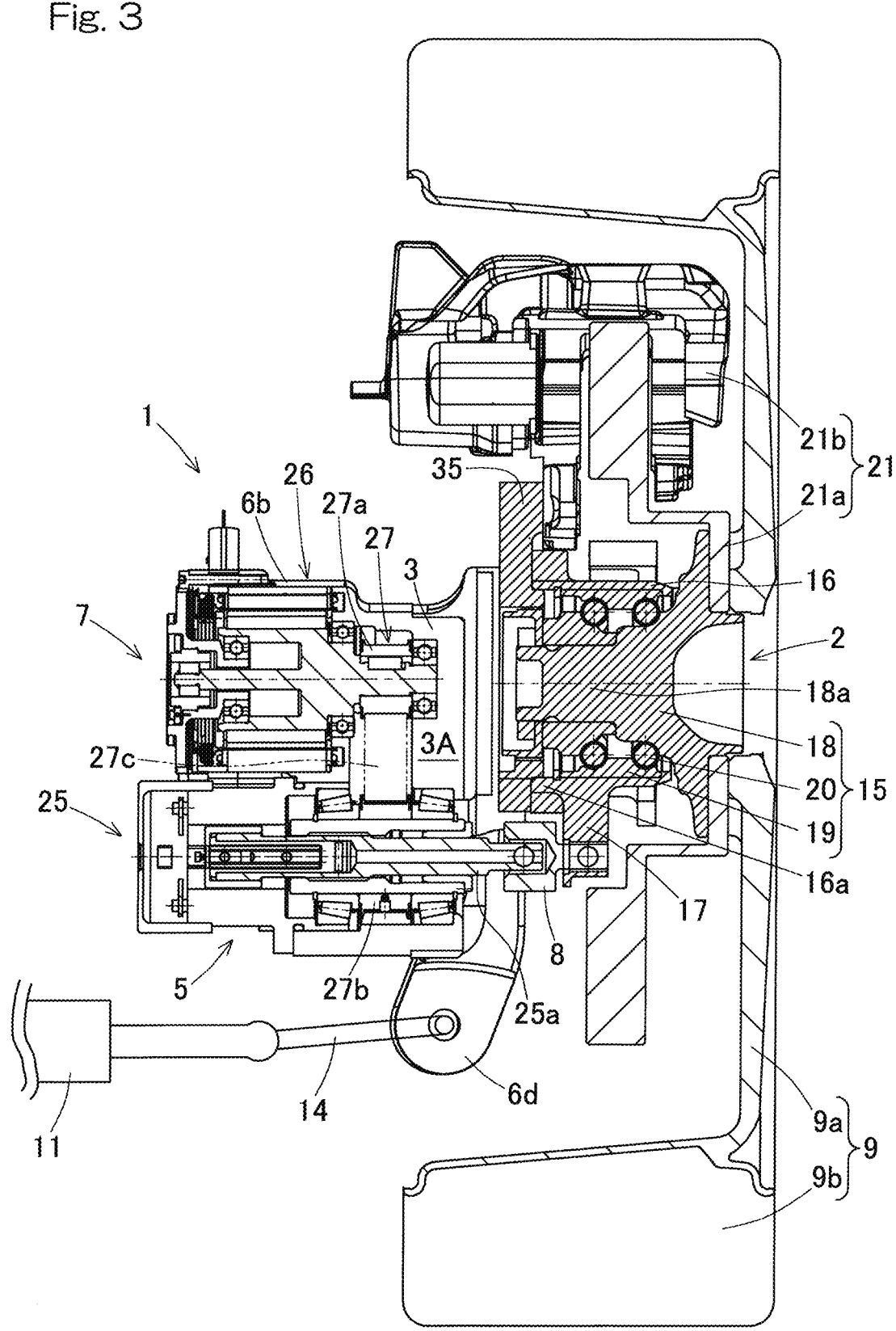
FIG. 3 is a horizontal sectional view illustrating features such as the mechanical section of the second steering device in FIG. 2.
Figure 4:
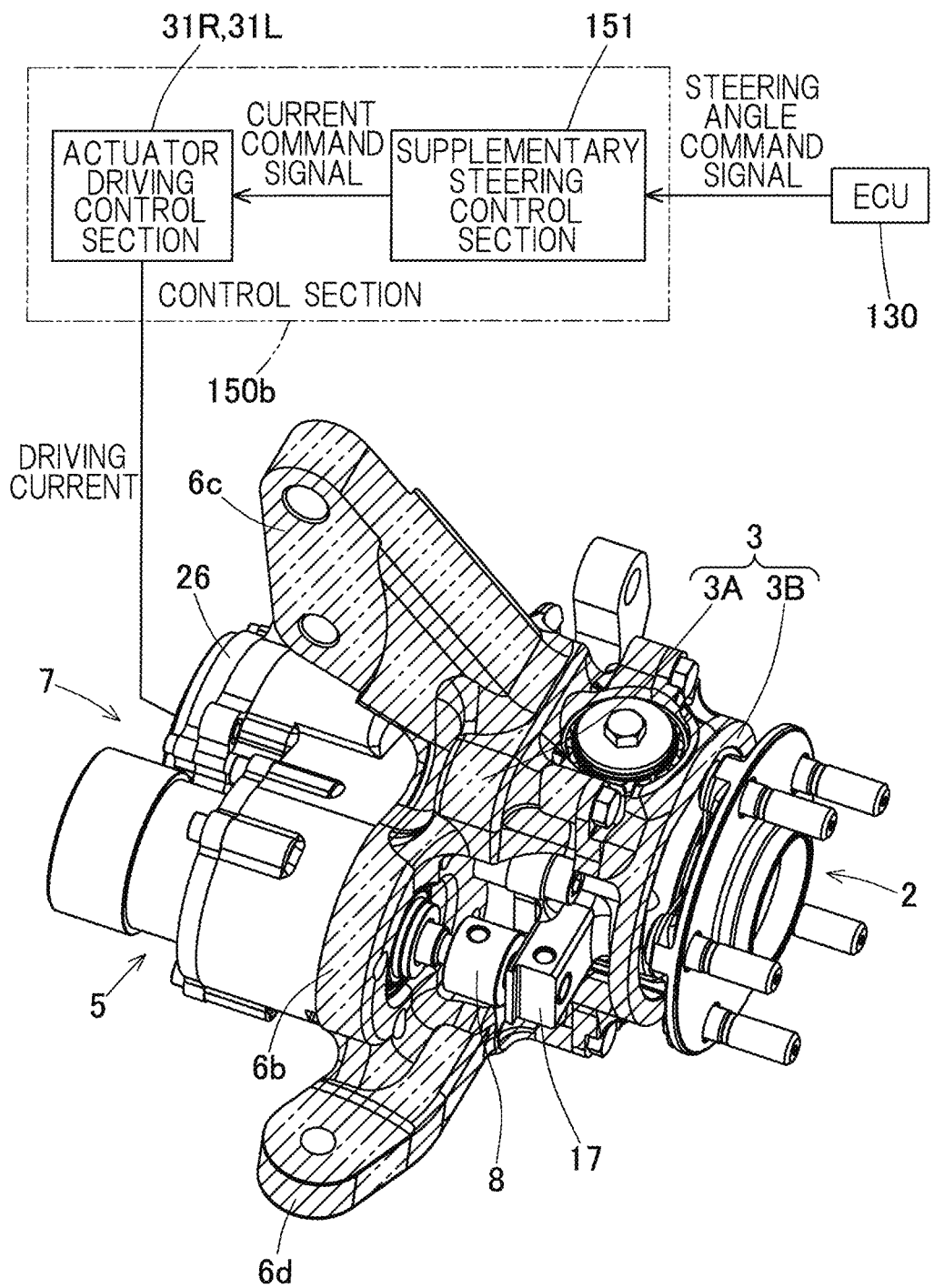
FIG. 4 is a perspective view showing an appearance of the mechanical section of the second steering device in FIG. 2.
Figure 5:
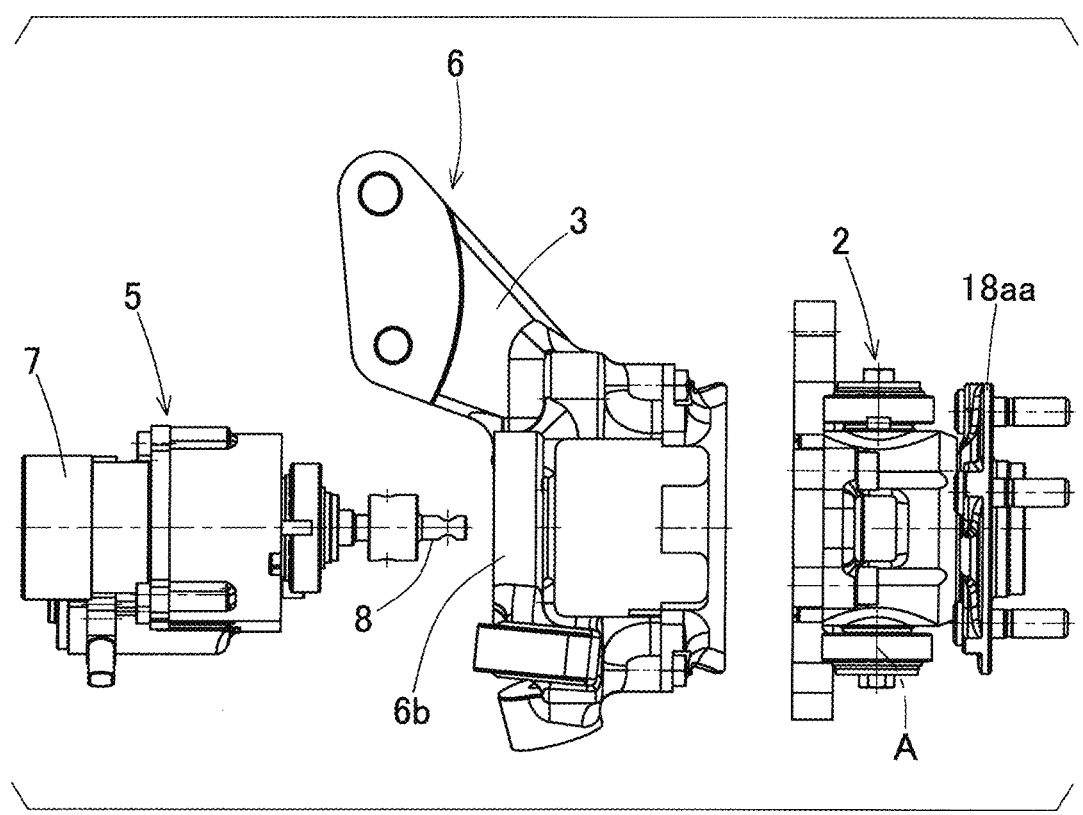
FIG. 5 is an exploded front view of the mechanical section of the second steering device in FIG. 2.
Figure 6:
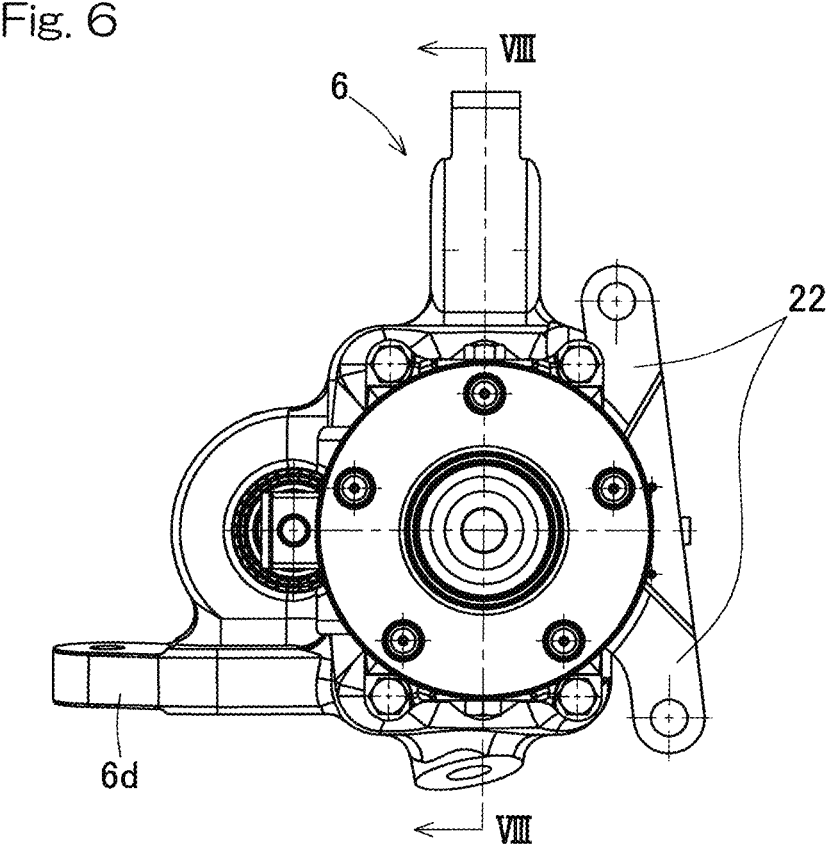
FIG. 6 is a side view of the mechanical section of the second steering device in FIG. 2.

As shown in FIG. 5, an actuator main body 7 of the steering actuator 5 is disposed on an inboard side of the unit support member 3, and the hub unit main body 2 is disposed on an outboard side of the unit support member 3. The "outboard side" refers to an outer side in a widthwise direction of a vehicle in a state where the hub unit 1 (FIG. 2) is mounted to the vehicle, and the "inboard side" refers to an inner side in the widthwise direction of the vehicle. As shown in FIG. 3 and FIG. 4, the hub unit main body 2 and the actuator main body 7 are connected by a joint part 8. The joint part 8 is typically attached with a non-illustrated boot for protection against water and dust.

As shown in FIG. 2, the hub unit main body 2 is supported by the unit support member 3 through the rotation-permitting support components 4, 4 provided above and below the hub unit main body so as to be rotatable about the turning axis A extending in a vertical direction. The turning axis A is different from a rotation axis O of the wheel 9 and from a king pin axis about which main steering is performed. A typical vehicle has a king pin angle in a range from 10 to 20 degrees in order to improve linear motion stability of vehicle travel. In this embodiment, the hub unit 1 has a turning axis having a different angle (axis) from the king pin angle. The wheel 9 includes a wheel body 9a and a tire 9b.

As shown in FIG. 1, the hub unit 1 (FIG. 2) of this embodiment is integrally provided to the knuckle 6 of the suspension device 12, as a mechanism for individually steering the left and right wheels by a small angle (about ±5 degrees) in addition to the steering of the right and left front wheels 9, 9 performed by the first steering device 11. Although the first steering device 11 is of a rack and pinion type, it may be of any type. Although the suspension device 12 is, for example, a strut type suspension mechanism in which a shock absorber is directly fixed to the knuckle 6, it may be of other type such as a multi-link type suspension mechanism.

Hub Unit Main Body 2

Figure 8:
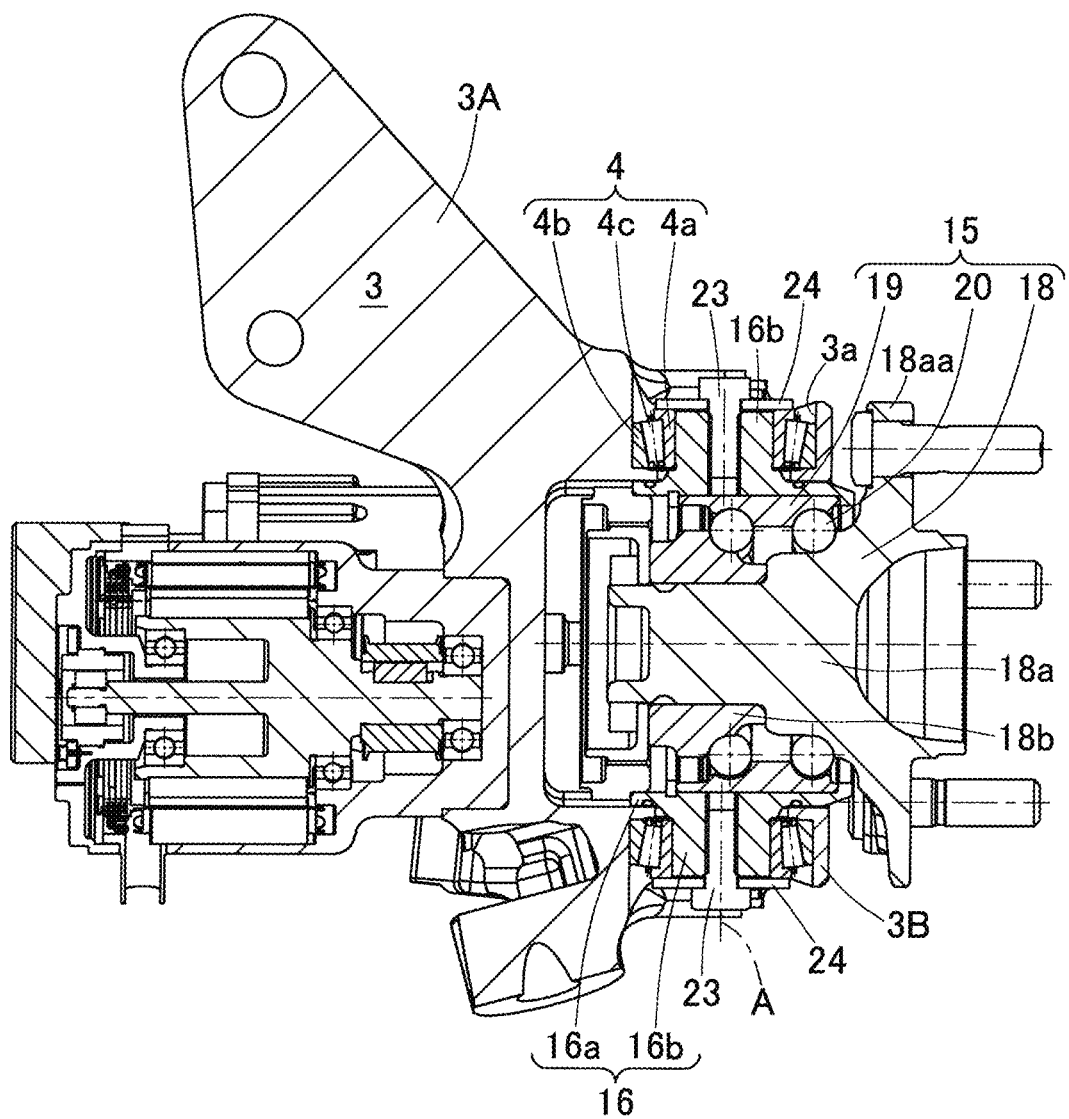
FIG. 8 is a sectional view along line VIII-VIII in FIG. 6.

As shown in FIG. 2, the hub unit main body 2 includes a hub bearing 15 for supporting the wheel 9, an outer ring 16, and an arm part 17 (FIG. 4) that is a steering-force receiving part described later. As shown in FIG. 8, the hub bearing 15 includes an inner race 18, an outer race 19, and rolling elements 20 (such as balls) interposed between the inner and outer races 18, 19. The hub bearing serves to connect a member on a vehicle body side and the wheel 9 (FIG. 2).

In the illustrated example, the hub bearing 15 is an angular ball bearing in which the outer race 19 serves as a stationary ring, the inner race 18 serves as a rotary ring, and the rolling elements 20 are arranged in double rows. The inner race 18 includes: a hub axle part 18a that has a hub flange 18aa and forms a raceway surface on the outboard side; and an inner ring part 18b that forms a raceway surface on the inboard side. As shown in FIG. 2, the wheel body 9a of the wheel 9 is fixed to the hub flange 18aa by a bolt such that the wheel body 9a is overlapped with a brake rotor 21a. The inner race 18 rotates about a rotation axis O.

As shown in FIG. 8, the outer ring 16 includes: an annular part 16a fitted to an outer peripheral surface of the outer race 19; and attachment shaft parts 16b, 16b each having a trunnion shaft shape, the attachment shaft parts being provided so as to protrude upwardly and downwardly from an outer periphery of the annular part 16a. Each of the attachment shaft parts 16b is provided so as to be coaxial with the turning axis A.

As shown in FIG. 3, each wheel 9 is provided with a brake 21 that is a brake device for braking the vehicle. The brake 21 includes the brake rotor 21a and a brake caliper 21b. The brake caliper 21b is mounted on two brake caliper attachment parts 22 (FIG. 6) at upper and lower position that are integrally formed with the outer race 19 so as to protrude in an arm-like manner.

Rotation-Permitting Support Component and Unit Support Member

As shown in FIG. 8, each of the rotation-permitting support components 4 includes a rolling bearing. In this example, a tapered roller bearing is used as the rolling bearing. The rolling bearing includes an inner race 4a fitted to the outer periphery of the attachment shaft part 16b, an outer race 4b fitted to the unit support member 3, and a plurality of rolling elements 4c interposed between the inner and outer races 4a, 4b.

The unit support member 3 includes a unit support member main body 3A and a unit support member joint body 3B. The unit support member main body 3A has an outboard side end to which the unit support member joint body 3B having a substantially ring shape is removably fixed. The unit support member joint body 3B has an inboard side surface having upper and lower portions each formed with a fitting hole forming part 3a having a partially concaved spherical shape.

Figure 7:
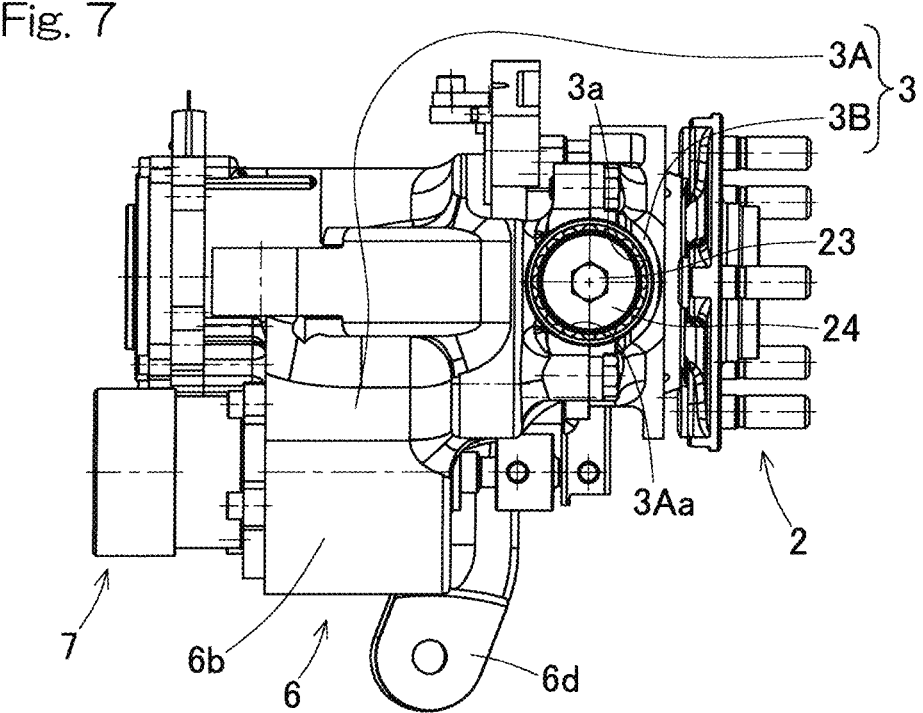
FIG. 7 is a plan view of the mechanical section of the second steering device in FIG. 2.

As shown in FIG. 7 and FIG. 8, the unit support member main body 3A has the outboard side end having upper and lower portions each formed with a fitting hole forming part 3Aa having a partially concaved spherical shape. As shown in FIG. 4, the unit support member joint body 3B is fixed to the outboard side end of the unit support member main body 3A such that the respective fitting hole forming parts 3a, 3Aa (FIG. 7) are put together in the upper and lower portions to define fitting holes each having a complete circumference. The outer race 4b (FIG. 8) is fitted into the fitting hole. It should be noted that in FIG. 4, the unit support member 3 is indicated by single dotted lines.

As shown in FIG. 8, each of the attachment shaft parts 16b of the outer ring 16 is formed with an internal thread portion extending in a radial direction, and a bolt 23 is screwed into the internal thread portion. Each of the rotation permitting support components 4 is preloaded by applying a pressing force to an end face of the inner race 4a by the bolt 23 screwed into the internal thread portion, with a pressing member 24 having a disk shape interposed on the end face of the inner race 4a. This makes it possible to improve rigidity of each of the rotation permitting support components 4. An initial load is set so as not to be released even where the weight of the vehicle acts on the hub unit 1. It should be noted that the rolling bearings of the rotation-permitting support components 4 are not limited to tapered roller bearings, and they may be angular ball bearings depending on use conditions such as maximum load. Even in such a case, a preload can be applied in the same way as described above.

As shown in FIG. 3, the arm part 17 serves as a point of application of a steering force applied to the outer race 19 of the hub bearing 15 and is integrally provided as a part of the outer periphery of the annular part 16a or a part of the outer periphery of the outer race 19 so as to protrude therefrom. The arm part 17 is rotatably coupled to a linear output part 25a of the steering actuator 5 through the joint part 8. This allows the linear output part 25a of the steering actuator 5 to advance/retreat so that the hub unit main body 2 is caused to rotate, i.e., to turn about the turning axis A (FIG. 2).

Steering Actuator 5

As shown in FIG. 4, the steering actuator 5 includes an actuator main body 7 configured to rotationally drive the hub unit main body 2 about the turning axis A (FIG. 2).

As shown in FIG. 3, the actuator main body 7 includes a motor 26, a speed reducer or reduction gear 27 configured to reduce the speed of rotation (number of rotation per unit time) of the motor 26, and a linear motion mechanism 25 configured to convert a forward/reverse rotation output from the speed reducer 27 into a reciprocating linear motion of the linear output part 25a. The motor 26 is, for example, a permanent magnet synchronous motor, or may be a direct current motor or an induction motor.

The speed reducer 27 may be a winding-type transmission mechanism, such as a belt transmission mechanism, or a gear train. In the example of FIG. 3, a belt transmission mechanism is used. The speed reducer 27 includes a driving pulley 27a, a driven pulley 27b, and a belt 27c. The driving pulley 27a is coupled to a motor shaft of the motor 26, and the driven pulley 27b is disposed in the linear motion mechanism 25. The driven pulley 27b is disposed parallel to the motor shaft. A driving force of the motor 26 is transmitted from the driving pulley 27a to the driven pulley 27b through the belt 27c. The driving pulley 27a, the driven pulley 27b and the belt 27c form the speed reducer 27 of a winding type.

The linear motion mechanism 25 may be a feed screw mechanism, such as a sliding screw and a ball screw, or a rack and pinion mechanism. In this example, a feed screw mechanism with a trapezoid sliding screw is used. Since the linear motion mechanism 25 includes the feed screw mechanism with the trapezoid sliding screw, the effects of preventing a reverse input from the tire 9b can be enhanced. The actuator main body 7 including the motor 26, the speed reducer 27 and the linear motion mechanism 25 is assembled as a semi-assembled product and is removably mounted to a casing 6b by e.g. a bolt. It is also possible to use a mechanism that directly transmits a driving force from the motor 26 to the linear motion mechanism 25 without involving a speed reducer.

The casing 6b is integrally formed with the unit support member main body 3A as a part of the unit support member 3. The casing 6b is formed in a bottomed cylindrical shape and includes a motor receiving part for supporting the motor 26 and a linear motion mechanism receiving part for supporting the linear motion mechanism 25. The motor receiving part is formed with a fitting hole for supporting the motor 26 at a predetermined position inside the casing. The linear motion mechanism receiving part is formed with a fitting hole for supporting the linear motion mechanism 25 at a predetermined position inside the casing and a through-hole for allowing the linear output part 25a to advance and retreat, for example.

As shown in FIG. 4, the unit support member main body 3A includes: the casing 6b; a shock absorber attachment part 6c that serves as an attachment part for a shock absorber; and a steering device joint part 6d that serves as a joint part for the first steering device 11 (FIG. 3). The shock absorber attachment part 6c and the steering device joint part 6d are also integrally formed with the unit support member main body 3A. The shock absorber attachment part 6c is formed in a protruding manner on an upper portion of an outer surface part of the unit support member main body 3A. The steering device joint part 6d is formed in a protruding manner on a side surface portion of the outer surface part of the unit support member main body 3A.

Features of Vehicle Information Detection Section 110

As shown in FIG. 9, the vehicle information detection section 110 is configured to detect vehicle information and outputs the vehicle information to the ECU 130. The vehicle information detection section 110 includes: a vehicle velocity detection module 111, a steering angle detection module 112, a vehicle height detection module 113, an actual yaw rate detection module 114, an actual lateral acceleration detection module 115, an accelerator pedal sensor 116, and a brake pedal sensor 117.

The vehicle velocity detection module 111 is configured to detect a velocity of the vehicle (vehicle velocity) on the basis of, e.g., an output of a sensor (not illustrated) such as a speed sensor attached inside a transmission of the vehicle and to output the vehicle velocity information (which may also be simply referred to as "vehicle velocity") to the ECU 130.

The steering angle detection module 112 is configured to detect a steering angle on the basis of, e.g., an output from a sensor (not illustrated) such as a resolver attached to a motor part of the first steering device 11 and to output the steering angle information (which may also be simply referred to as "steering angle" or "wheel angle") to the ECU 130.

The vehicle height detection module 113 is configured to detect a vehicle height of each wheel 9 (FIG. 1) to be steered by the second steering device 150, by measuring a distance between a chassis of the vehicle 100 (FIG. 1) and the ground using a laser displacement gauge or by detecting an angle of a non-illustrated upper arm or lower arm of the suspension device 12 (FIG. 1) of the vehicle 100 using an angle sensor, for example. The vehicle height detection module 113 then outputs the detected vehicle height to the ECU 130 as the vehicle height information.

The actual yaw rate detection module 114 is configured to detect an actual yaw rate on the basis of, e.g., an output of a sensor such as a gyro sensor attached to the vehicle 100 (FIG. 1) and to output the actual yaw rate information to the ECU 130.

The actual lateral acceleration detection module 115 is configured to detect an actual lateral acceleration on the basis of, e.g., an output of a sensor such as a gyro sensor attached to the vehicle 100 (FIG. 1) and to output the actual lateral acceleration information to the ECU 130. The accelerator pedal sensor 116 is configured to detect an input by a driver to an accelerator pedal 210 and to output the detected value to the ECU 130 as an acceleration command value. The brake pedal sensor 117 is configured to detect an input by a driver to a brake pedal 220 as a brake pressing force and to output the detected value to the ECU 130 as a brake command value. The ECU 130 is configured to output vehicle information including a steering angle command signal to the control section 150b of the second steering device 150.

Control Section 150b of Second Steering Device 150

The control section 150b of the second steering device 150 is configured to obtain vehicle information including vehicle velocity information, steering angle information, vehicle height information, actual yaw rate information, actual lateral acceleration information, an acceleration command value, and a brake command value from the ECU 130, and the supplementary steering control section 151 is configured to control a right-wheel actuator driving control section 31R and a left-wheel actuator driving control section 31L on the basis of the obtained vehicle information such that the right-wheel hub unit 1R and the left-wheel hub unit 1L can drive the respective motors 26 to independently steer the left and right wheels.

In the control section 150b, the relationship between each type of the information such as the steering angle information that is the vehicle information and the command value for driving the motor 26 is defined as a control rule using, for example, a map or an operation formula, and the control rule is used to perform a control. Although the control section 150b is, for example, provided as a dedicated ECU, it may be provided as a part of the main ECU 130.

The supplementary steering control section 151 of the control section 150b includes a turning angle control module 37. The turning angle control module 37 is configured to control the steering actuator 5 (FIG. 2) pursuant to a predetermined rule in accordance with a vehicle velocity and a steering angle obtained from the ECU 130 to control the turning angles of the left and right wheels 9, 9. Specifically, the turning angle control module 37 is configured to obtain a wheel angle $\theta T$ to be steered by the first steering device 11 connected to the steering wheel 200 from the steering angle detection module 112 through the ECU 130. The turning angle control module 37 is also configured to obtain a vehicle velocity from the vehicle velocity detection module 111 through the ECU 130.

Figure 10:
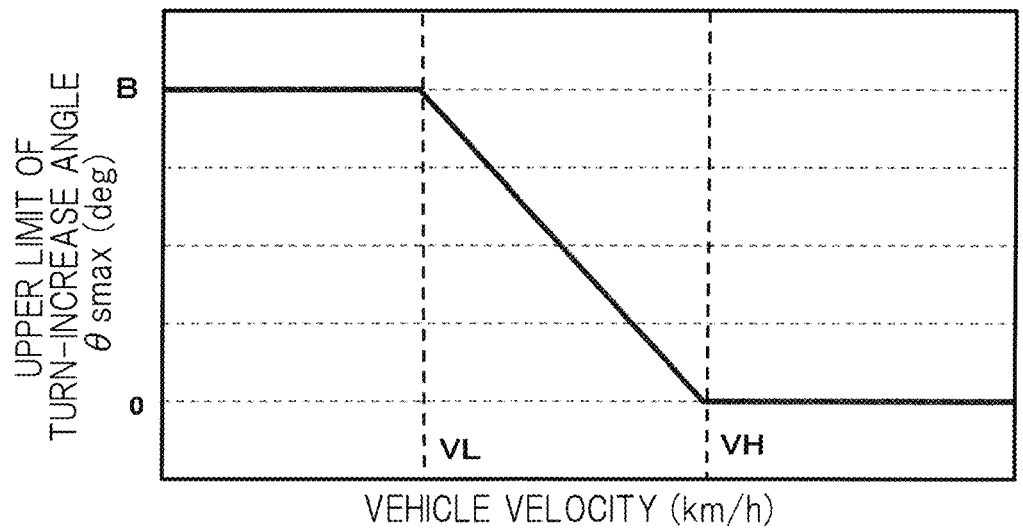
FIG. 10 is a graph showing a relationship between vehicle velocity and upper limit of turn-increase angle.

As the predetermined rule, the vehicle velocity and the upper limit value $\theta smax$ of a turn-increase amount $\theta s$ of the wheel angle may have, for example, the relationship as shown in FIG. 10. The upper limit value of the turn-increase angle of the wheel angle is set to B degrees in a low-speed range of the vehicle velocity (0 to VL km/h), and the upper limit value of the turn-increase angle is gradually decreased as the vehicle velocity increases from VL km/h and is set to 0 degree in a high-speed range (VH km/h or higher). The values of B degrees, VL km/h, and VH km/h may vary in accordance with the vehicle information.

Figure 11:
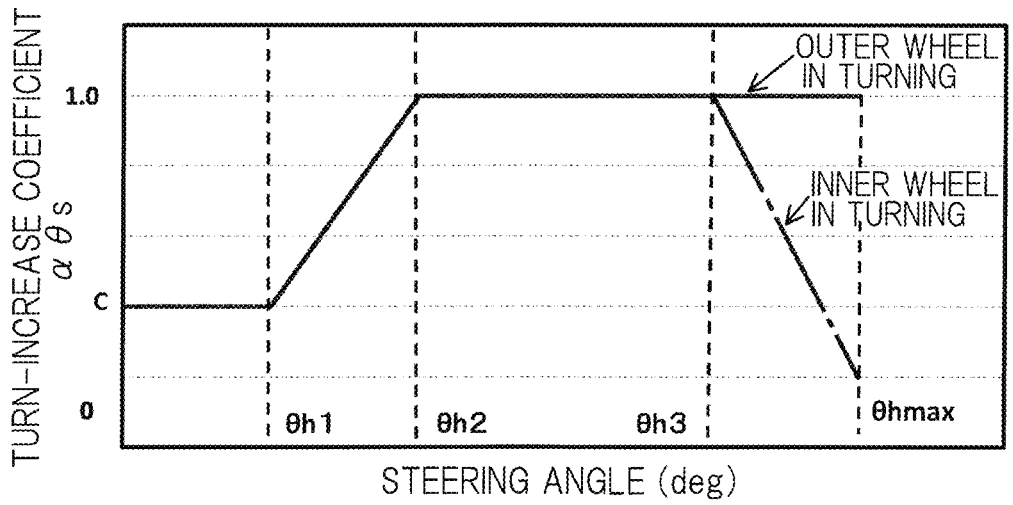
FIG. 11 is a graph showing a relationship between steering angle and turn-increase coefficient.

Further, as the predetermined rule, the steering angle and the turn-increase coefficient abs may have, for example, the relationship as shown in FIG. 11. The turn-increase coefficient $\alpha\theta s$ is a coefficient that determines the turn-increase amount of the wheel angle. In an extremely small steering angle range (0 to $\theta h1$ degrees) during turning, the turn-increase coefficient is set to c (c may be arbitrarily set to a value equal to or greater than zero and smaller than 1.0 through testing or the like). This is to prevent unsteadiness of the vehicle travel due to a large change in the toe angles of the wheels relative to an operation amount of the steering wheel by a driver where the steering angle is small.

Then, in a small steering angle range ($\theta h1$ to $\theta h2$ degrees), the turn-increase coefficient is increased as the steering angle increases, and the turn-increase coefficient is set to 1.0 when the steering angle is $\theta h2$ degrees. In a large steering angle range ($\theta h3$ to $\theta hmax$ degrees), the turn-increase coefficient of an inner wheel in turning is gradually decreased as the steering angle increases such that the inner wheel in turning does not interfere with the tire housing 105 (FIG. 1). This makes it possible to prevent interference between the inner wheel in turning and the tire housing 105 (FIG. 1) and to turn only the outer wheel in turning by an increased amount because the turn-increase coefficient of the outer wheel in turning is set to 1.0. Thus, the minimum turning radius can be reduced without changing the size of the tire housing 105 (FIG. 1).

As shown in FIG. 9 to FIG. 11, the turning angle control module 37 is configured to set the upper limit value $\theta smax$ of the turn-increase amount $\theta s$ of the wheel angle in accordance with the vehicle velocity. The turning angle control module 37 is also configured to set the turn-increase coefficient $\alpha\theta s$ in accordance with the steering angle. The turning angle control module 37 is configured to set the turn-increase amount $\theta s$ of the wheel angle by multiplying the turn-increase coefficient $\alpha\theta s$ by the upper limit value $\theta smax$ of the turn-increase angle, as shown in the following formula.

$$\theta s = \alpha\theta s \cdot \theta smax$$

Thus, by controlling the turning angles of the left and right wheels 9, 9, it is possible to stably drive the vehicle and to reduce the turning radius.

Flowchart

Figure 12:
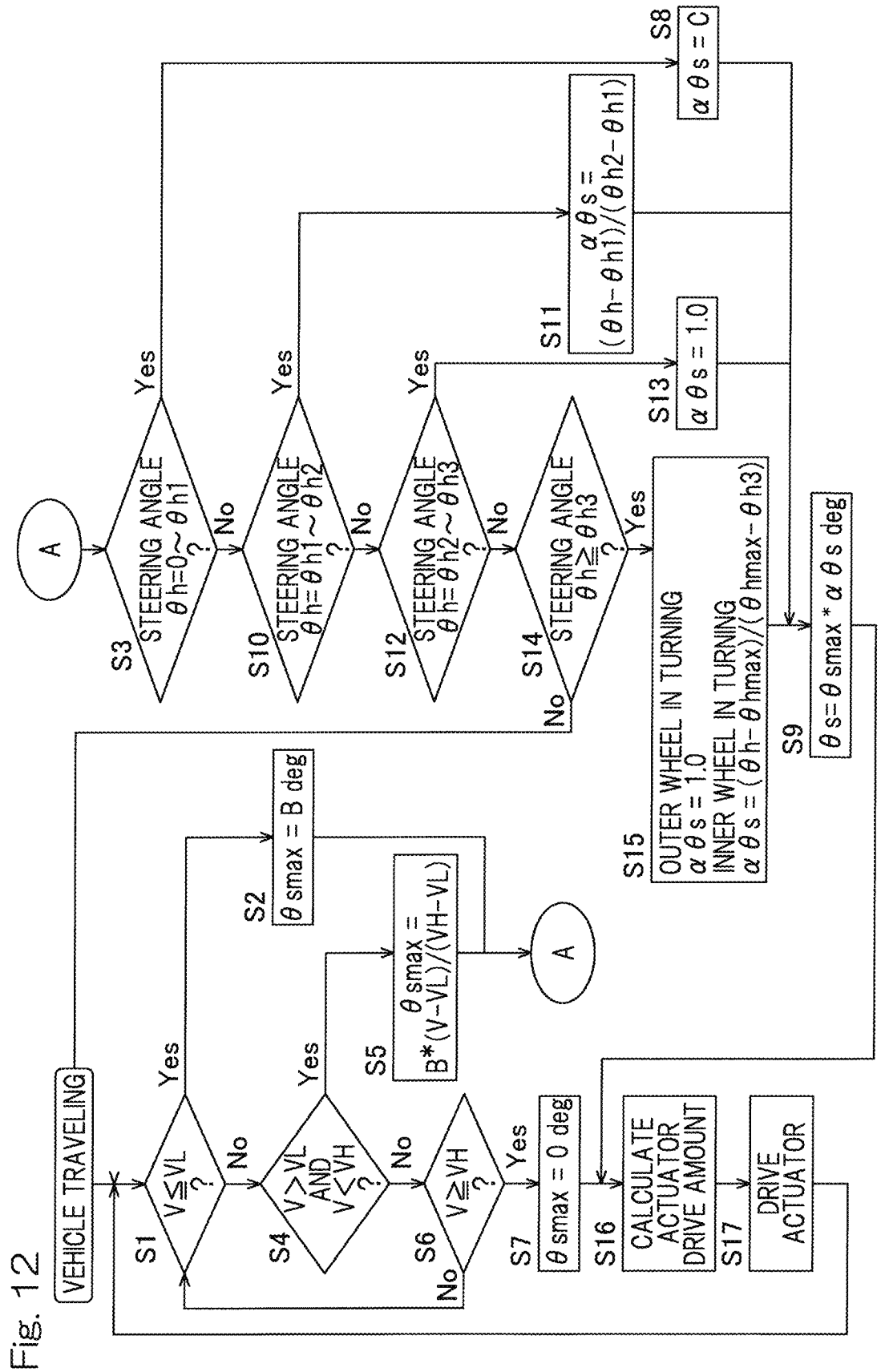
FIG. 12 is a flowchart showing a step-by-step process of controlling a turning angle in a control section of the second steering device in FIG. 2.

FIG. 12 is a flowchart showing a step-by-step process of controlling a turning angle. The process will be described with reference to FIG. 9 to FIG. 11 as needed.

During the vehicle travel, when the vehicle velocity is in a low-speed range (V≤VL km/h) (step S1: Yes), the turning angle control module 37 sets the upper limit value $\theta smax$ of the turn-increase angle of the wheel angle to B degrees (step S2), which is the maximum value, and the process moves to step S3. When the vehicle velocity V is in a range from VL to VH km/h (step S4: Yes), the turning angle control module 37 sets the upper limit value of the turn-increase angle in accordance with an increase in the vehicle velocity (step S5) and the process moves to step S3. When the vehicle velocity is in a high-speed range (VH km/h or higher) (step S6: Yes), the turning angle control module 37 sets the upper limit value $\theta smax$ of the turn-increase angle to 0 degree (step S7). When it is determined that the vehicle velocity is not in the high-speed range (step S6: No), the process returns to step S1.

In step S3, when it is determined that the steering angle is in an extremely small steering angle range (step S3: Yes), the turn-increase coefficient is set to c (step S8), and the process moves to step S9. When it is determined that the steering angle is in a small steering angle range (step S3: No, step S10: Yes), the turn-increase coefficient is increased as the steering angle increases (step S11), and the process then moves to step S9. When the steering angle is from $\theta h2$ to θh3 (step S12: Yes), the turn-increase coefficient is set to 1.0 (step S13). Then, the process moves to step S9.

When the steering angle is θh3 or larger (step S12: No, step S14: Yes), only the outer wheel in turning is turned by an increased amount (step S15). Next, the turning angle control module 37 sets the turn-increase amount θs of the wheel angle by multiplying the turn-increase coefficient αθs by the upper limit value θsmax of the turn-increase angle (step S9). Then, the process moves to step S16. The control section 150b calculates a driving condition of each steering actuator (such as a current to be supplied to the motor 26) (step S16) and drives each steering actuator (step S17). Then, the process returns to step S1.

Figure 13:
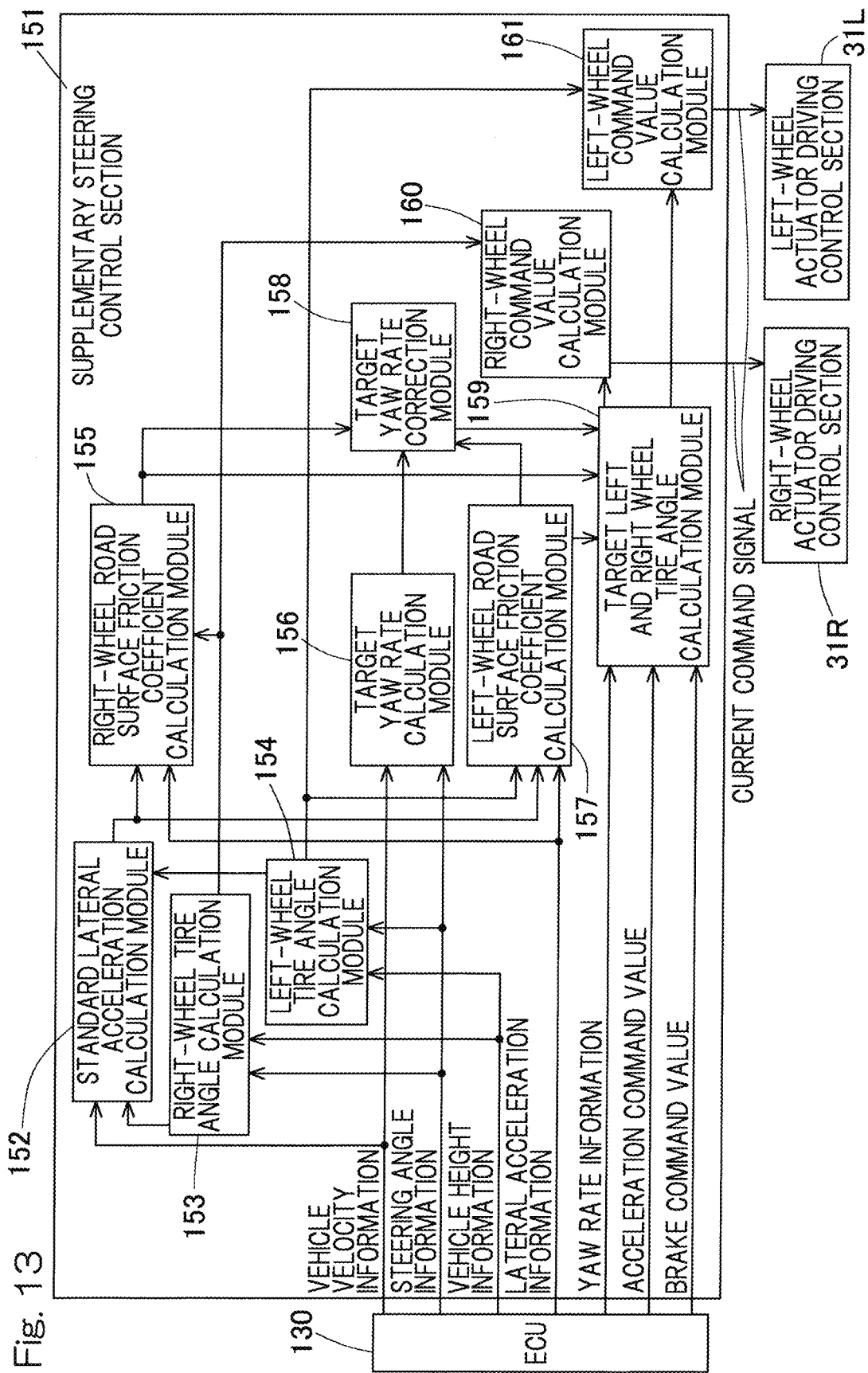
FIG. 13 is a block diagram illustrating features of a supplementary steering control section of the second steering device in FIG. 2.

The supplementary steering control section 151 is configured to perform a control for independently steer the left and right wheels as shown in FIG. 13, in addition to the above described control in accordance with the vehicle velocity and the steering angle (control shown in FIG. 12). The control in FIG. 13 and the control in FIG. 12, etc., may be switched in accordance with an operation by a driver or vehicle conditions, etc., or be executed in parallel.

As shown in FIG. 13, the supplementary steering control section 151 includes: a standard lateral acceleration calculation module 152, a right-wheel tire angle calculation module 153, a left-wheel tire angle calculation module 154, a right-wheel road surface friction coefficient calculation module 155, a target yaw rate calculation module 156, a left-wheel road surface friction coefficient calculation module 157, a target yaw rate correction module 158, a target left and right wheel tire angle calculation module 159, a right-wheel command value calculation module 160, and a left-wheel command value calculation module 161.

The right-wheel tire angle calculation module 153 and the left-wheel tire angle calculation module 154 are configured to obtain the steering angle information and the vehicle height information from the ECU 130 at predetermined intervals. The right-wheel tire angle calculation module 153 and the left-wheel tire angle calculation module 154 are configured to calculate present angles of the tires to be steered by the second steering device 150 (FIG. 9) on the basis of the obtained steering angle information and the vehicle height information and to output the calculated tire angle information to the standard lateral acceleration calculation module 152.

The standard lateral acceleration calculation module 152 is configured to calculate a standard lateral acceleration on the basis of the vehicle velocity information and the tire angle information obtained from the ECU 130. The standard lateral acceleration calculation module 152 is configured to output the calculated standard lateral acceleration as standard lateral acceleration information to the right-wheel road surface friction coefficient calculation module 155 and the left-wheel road surface friction coefficient calculation module 157.

Figure 14:
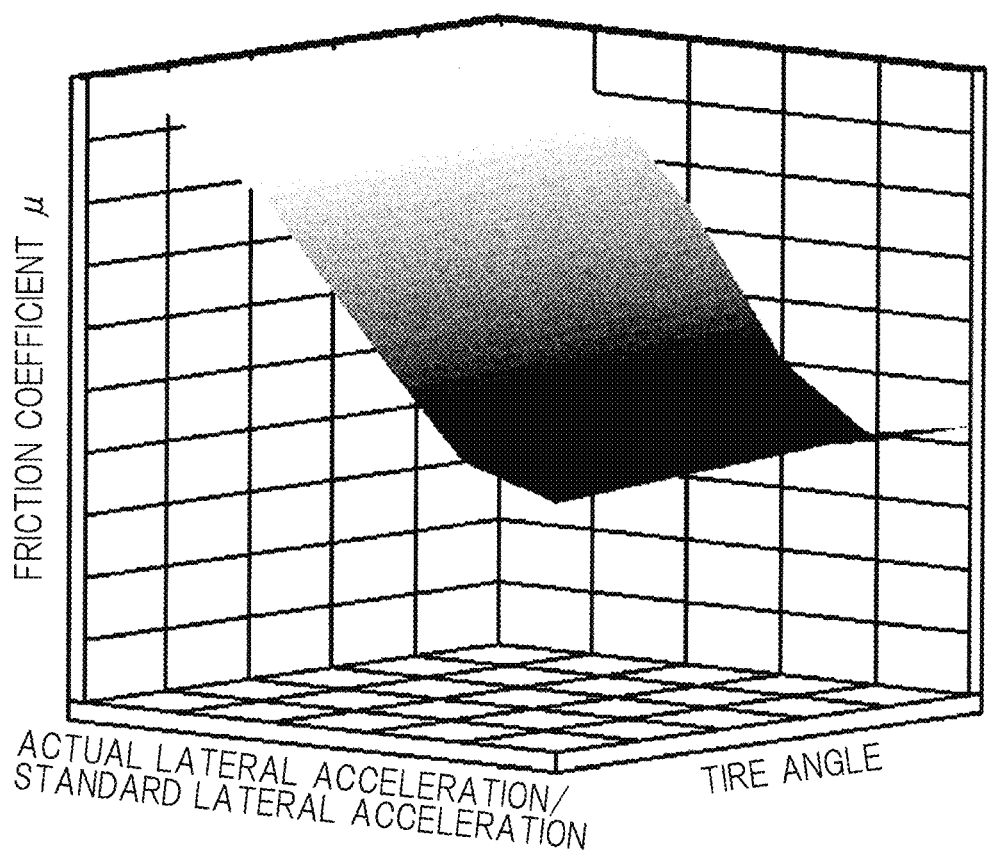
FIG. 14 is a graph showing an exemplary relationship between actual lateral acceleration/standard lateral acceleration, tire angle, and friction coefficient.

FIG. 14 shows a map for calculating a road surface friction coefficient, and the map is stored in the right-wheel road surface friction coefficient calculation module 155 and the left-wheel road surface friction coefficient calculation module 157 shown in FIG. 13.

The right-wheel road surface friction coefficient calculation module 155 and the left-wheel road surface friction coefficient calculation module 157 are configured to calculate a road surface friction coefficient on the basis of the actual lateral acceleration information obtained from the ECU 130 and the standard lateral acceleration information inputted from the standard lateral acceleration calculation module 152. Specifically, the right-wheel road surface friction coefficient calculation module 155 and the left-wheel road surface friction coefficient calculation module 157 are configured to obtain the tire angle information from the right-wheel tire angle calculation module 153 and the left-wheel tire angle calculation module 154 when the standard lateral acceleration information is inputted from the standard lateral acceleration calculation module 152. The right-wheel road surface friction coefficient calculation module 155 and the left-wheel road surface friction coefficient calculation module 157 are configured to calculate a road surface friction coefficient from an actual lateral acceleration/a standard lateral acceleration and a tire angle on the basis of the map (FIG. 14). The right-wheel road surface friction coefficient calculation module 155 and the left-wheel road surface friction coefficient calculation module 157 are configured to output the right-wheel road surface friction coefficient information that is the calculated road surface friction coefficient of the right wheel and the left-wheel road surface friction coefficient information that is the calculated road surface friction coefficient of the left wheel to the target yaw rate correction module 158.

The target yaw rate calculation module 156 is configured to calculate a target yaw rate on the basis of the vehicle velocity information and the steering angle information obtained from the ECU 130 at predetermined intervals and to output the calculated target yaw rate as target yaw rate information to the target yaw rate correction module 158.

The target yaw rate correction module 158 is configured to obtain the target yaw rate information from the target yaw rate calculation module 156 when the right-wheel road surface friction coefficient information and the left-wheel road surface friction coefficient information are inputted from the right-wheel road surface friction coefficient calculation module 155 and the left-wheel road surface friction coefficient calculation module 157, respectively. The target yaw rate correction module 158 is configured to correct the target yaw rate in accordance with the road surface friction coefficient indicated by the right-wheel road surface friction coefficient information and the left-wheel road surface friction coefficient information. The target yaw rate correction module 158 is configured to output the target yaw rate after correction as corrected yaw rate information to the target left and right wheel tire angle calculation module 159.

When the corrected yaw rate information is inputted, the target left and right wheel tire angle calculation module 159 is configured to obtain the actual yaw rate information, an acceleration command value, and a brake command value from the ECU 130, to obtain the right-wheel road surface friction coefficient information and the left-wheel road surface friction coefficient information, and to calculate the target left and right wheel tire angles that are target values of the tire angles of the left and right wheels. Specifically, the target left and right wheel tire angle calculation module 159 calculates respective target angles of the left and right tires based on the following formula (1).

[Math 1]

$$\theta_{tR1} = f_{tR}(\theta_y, X_A, X_B, \mu_R)$$
$$\theta_{tL1} = f_{tL}(\theta_y, X_A, X_B, \mu_L) \quad (1)$$

In the formula (1), $\theta_y$ is an actual yaw rate amount of the vehicle indicated by the actual yaw rate information, $X_A$ is an acceleration command value, $X_B$ is a brake command value, $\mu_R$ is a right-wheel road surface friction coefficient, $\mu_L$ is a left-wheel road surface friction coefficient, $\theta_{tR1}$ is a target tire angle of the right wheel, and $\theta_{tL1}$ is a target tire angle of the left wheel.

The target left and right wheel tire angle calculation module 159 is configured to output the calculated respective target tire angles of the left and right wheels as target tire angle information to the right-wheel command value calculation module 160 and the left-wheel command value calculation module 161.

When each input of the target tire angle information is entered, the right-wheel command value calculation module 160 and the left-wheel command value calculation module 161 are configured to obtain the tire angle information that indicates present tire angles from the right-wheel tire angle calculation module 153 and the left-wheel tire angle calculation module 154 and to compare the target tire angles indicated by the target tire angle information and the present tire angles. When there is a deviation in the comparison of the target tire angles and the present tire angles, the right-wheel steering amount information and the left-wheel steering amount information are generated which indicate steering amounts of the right-wheel hub unit 1R (FIG. 9) and the left-wheel hub unit 1L (FIG. 9), respectively. The right-wheel command value calculation module 160 is configured to output the generated right-wheel steering amount information (current command signal) to the right-wheel actuator driving control section 31R, and the left-wheel command value calculation module 161 is configured to output the generated left-wheel steering amount information (current command signal) to the left-wheel actuator driving control section 31L.

Each of the actuator driving control sections 31R, 31L includes an inverter. Each of the actuator driving control sections 31R, 31L is configured to control a current to the motor 26 (FIG. 9) of each steering actuator on the basis of the right-wheel steering amount information or the left-wheel steering amount information. Specifically, as shown in FIG. 9 and FIG. 13, when the right-wheel steering amount information and the left-wheel steering amount information are inputted from the right-wheel command value calculation module 160 and the left-wheel command value calculation module 161, respectively, each of the actuator driving control sections 31R, 31L obtains positional information of each motor 26 indicating a present turning angle of the right-wheel hub unit 1R or the left-wheel hub unit 1L, sets a target position of the motor 26 on the basis of the right-wheel steering amount information or the left-wheel steering amount information, and controls a current to be supplied to each motor 26.

That is, as shown in FIG. 4, each of the actuator driving control sections 31R, 31L is configured to output a current in accordance with a current command signal inputted from the supplementary steering control section 151 to drive and control the steering actuator 5. The actuator driving control sections 31R, 31L are configured to control power to be supplied to coils of the motors 26. Each of the actuator driving control sections 31R, 31L may, for example, form a half-bridge circuit using a non-illustrated switching element and perform PWM control for setting a motor application voltage in accordance with an ON-OFF duty ratio of the switching element. This makes it possible to slightly change the angles of the wheels in addition to the steering in response to an operation of the steering wheel by a driver.

Effects and Advantages

According to the above-described steering system 101, the first steering device 11 steers the wheels 9, 9 in accordance with a command of a steering amount outputted by a steering command device. The steering command device may be, for example, the steering wheel 200 operated by a driver or an automated steering command device. Such a steering command device can be used to adjust the direction of the vehicle 100 in the same manner as that in a conventional vehicle.

The second steering device 150 drives the steering actuators 5 disposed in the tire housings 105 to individually control the left and right wheels 9, 9. In the control section 150b of the second steering device 150, the turning angle control module 37 can control the steering actuators 5 in accordance with a vehicle velocity and a steering angle obtained from the vehicle information detection section 110 so as to, for example, slightly bring the wheels into a toe-in alignment when the vehicle is driving straight at high speed. This makes it possible to enhance traveling stability when the vehicle drives straight. The turning angle control module 37 can suitably adjust (or increase) the turning angles of the left and right wheels 9, 9 while the vehicle turns in accordance with travel conditions of the vehicle so as to improve small-turn performance of the vehicle.

In a vehicle having "Ackermann geometry," since an inner wheel in turning is turned by a larger wheel angle than that of an outer wheel in turning so as to have a single center of turning, interference between the wheel 9 and the tire housing 105 occurs on an inner wheel side. Therefore, the outer wheel in turning can further be turned without changing the size of the tire housing 105, making it possible to reduce the minimum turning radius.

In the mechanical section 150a of the second steering device 150, the hub unit main body 2 including the hub bearing 15 can be freely rotated about the turning axis A in a certain range by driving the steering actuator 5. Thus, each of the wheels can be independently steered, and the toe angles of the wheels 9 can be arbitrarily changed in accordance with travel conditions of the vehicle 100.

It is also possible to change a difference of the turning angles of the left and right wheels 9, 9 in accordance with a driving speed during turning. For example, it is possible to change the steering geometries during driving so as to assume parallel geometry when turning in a high-speed range and Ackermann geometry when turning in a low-speed range. Thus, the wheel angles can be arbitrarily changed during driving so that the vehicle 100 can have improved motion performance so as to achieve stable and safe driving. Further, by suitably changing the turning angles of the left and right wheels to be steered, it is possible to reduce a turning radius of the vehicle 100 during turning and to improve small-turn performance.

Other Embodiments

In the following description, the same reference numerals are used to denote parts that correspond to those described above in the respective embodiments, and overlapping description is omitted. Where only a part of a configuration is described, the rest of the configuration is to be construed as being the same as the above-described embodiments unless otherwise indicated. The same configurations provide the same effects. It is possible not only to combine the parts that have been particularly described in the respective embodiments but also to partly combine the embodiments unless there is any hindrance to such a combination.

Second Embodiment

Figure 15:
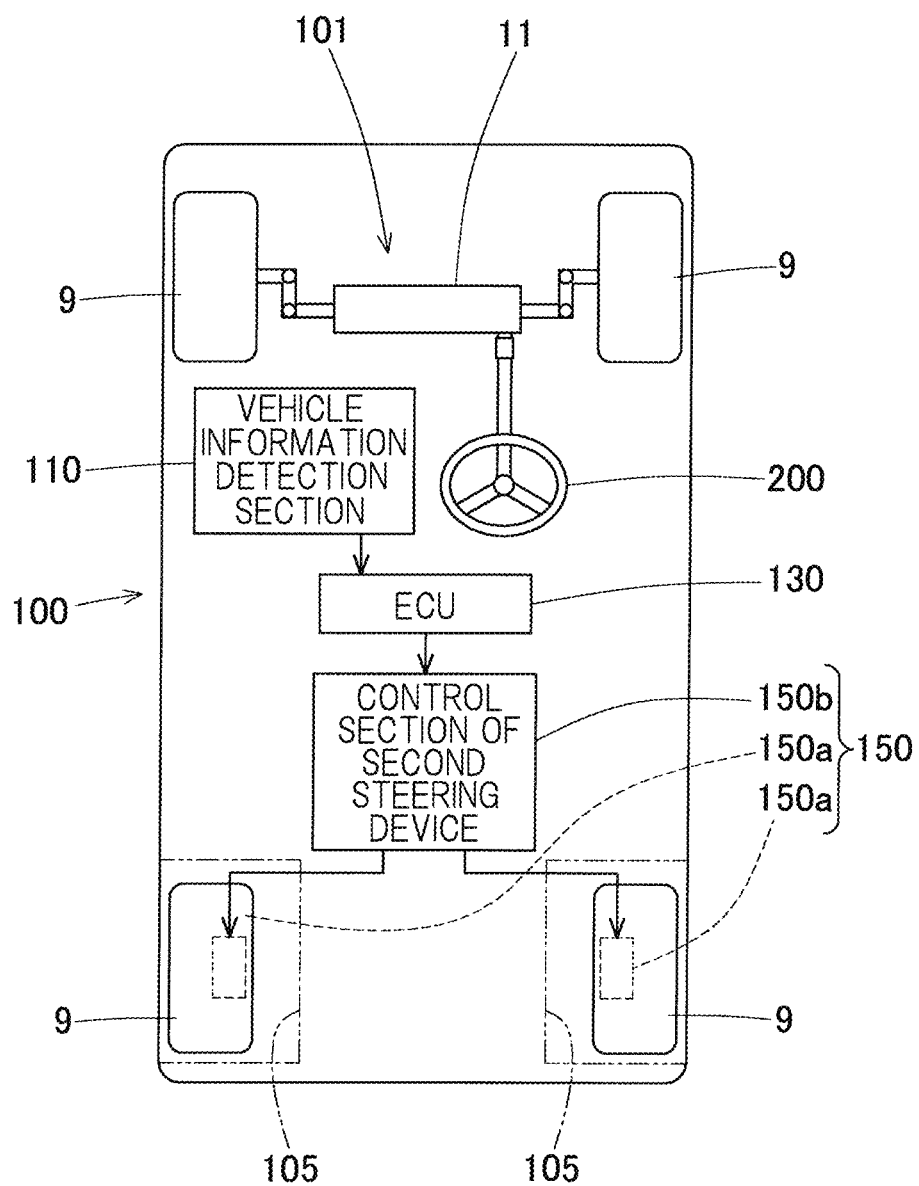
FIG. 15 schematically shows conceptual features of a steering system according to a second embodiment of the present invention.

As shown in FIG. 15, a steering system 101 according to a second embodiment differs from the first embodiment in that the first steering device 11 and the second steering device 150 steer different wheels 9, respectively. That is, in the steering system 101, the first steering device 11 steers the left and right front wheels 9, 9 of the vehicle 100, and the second steering device 150 steers the left and right rear wheels 9, 9 of the vehicle 100. The mechanical sections 150b of the second steering device 150 are disposed in the tire housings 105 for the rear wheels.

Third Embodiment

Figure 16:
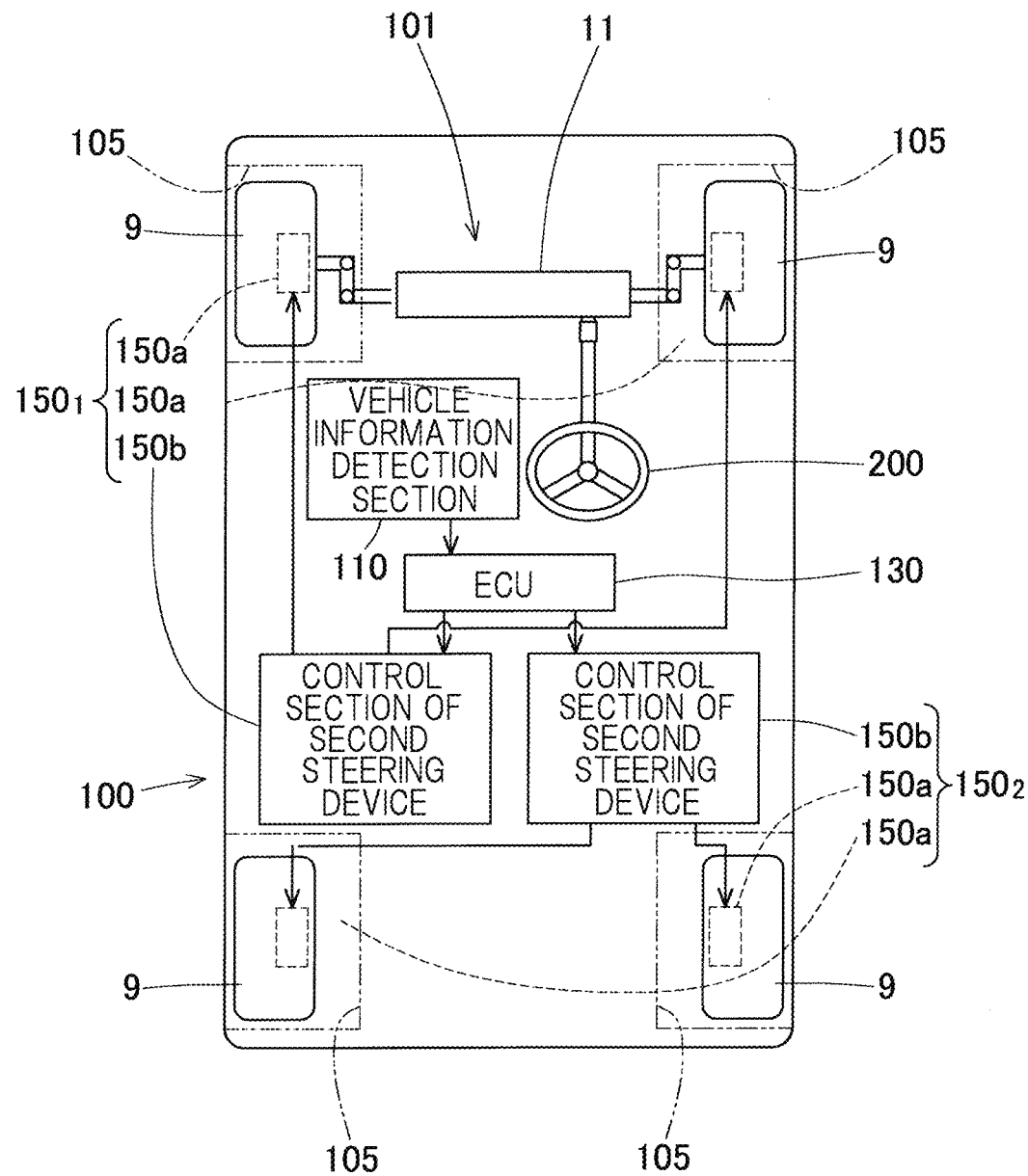
FIG. 16 schematically shows conceptual features of a steering system according to a third embodiment of the present invention.

As shown in FIG. 16, a steering system 101 according to a third embodiment differs from the first embodiment in that the system includes two second steering devices $150_1$, $150_2$. One second steering device $150_1$ of the two second steering devices steers the left and right front wheels 9, 9 in the same manner as the first steering device 11, and the other second steering device $150_2$ steers the left and right rear wheels 9, 9. That is, the second steering device $150_1$ operates in the same manner as the second steering device 150 according to the first embodiment, and the other second steering device $150_2$ operates in the same manner as the second steering device 150 according to the second embodiment.

According to the steering system 101, provision of multiple (two in this example) second steering devices $150_1$, $150_2$ makes it possible to independently steer the four wheels in a more complex manner as well as to enhance traveling stability and reduce fuel consumption of the vehicle 100.

A vehicle including a steering system according to another embodiment may include second steering devices that are steering devices capable of independently steering respective left and right wheels, these respective wheels being capable of being independently driven by steering actuators, and these steering devices being, for example, of a steer-by-wire type which are not mechanically connected to a steering command device. It should be noted that although the above embodiments are described referring to the case where the steering command device is the steering wheel 200, the steering command device may be a manual steering command device other than the steering wheel 200 (such as a joystick) or an automated steering command device 200A as shown in FIG. 9. The automated steering command device 200A is a device that recognizes a vehicle surrounding condition from a vehicle surrounding condition detection section 230 and automatically generates a steering command. The vehicle surrounding condition detection section 230 may be, for example, a sensor such as a camera and a millimeter-wave radar.

The automated steering command device 200A may, for example, recognize white lines and objects on a road, generate and output a steering command. The automated steering command device 200A may be a part of a device for automatically driving the vehicle or a device for supporting steering performed by manual driving. Even in a vehicle including such a steering command device 200A for automatically generating a steering command, provision of the second steering device 150 makes it possible to perform an operation which cannot be performed by the first steering device 11 (such as toe angle control) and to perform main steering in a vehicle traveling direction by using the first steering device 11 while correcting the main steering by using the second steering device 150. Thus, it is possible to correct the direction of the vehicle in response to a steering amount command and to maintain traveling stability of the vehicle.

Although the present invention has been fully described in connection with the embodiments thereof, the embodiments disclosed herein are merely examples in all respects and are not to be taken as limiting the scope of the present invention in any way whatsoever. The scope of the present invention is to be determined by the appended claims, not by the above description, and is intended to include any change made within the scope of claims or equivalent thereto.

REFERENCE NUMERALS

2 . . . Hub unit main body
3 . . . Unit support member
5 . . . Steering actuator
6 . . . Knuckle (chassis frame component)
9 . . . Wheel
11 . . . First steering device
12 . . . Suspension device
15 . . . Hub bearing
31R, 31L . . . Actuator driving control section
37 . . . Turning angle control module
100 . . . Vehicle
101 . . . Steering system
105 . . . Tire housing
110 . . . Vehicle information detection section
150 . . . Second steering device
150a . . . Mechanical section
150b . . . Control section
151 . . . Supplementary steering control section
200 . . . Steering wheel (steering command device)
200A . . . Automatic steering command device

What is claimed is:

1. A steering system for a vehicle, the steering system comprising:
   a first steering device configured to steer wheels of the vehicle in accordance with a command of a steering amount outputted by a steering command device;
   a second steering device including a mechanical section configured to individually steer each of the wheels on left and right sides about a turning axis which is different from a king pin axis with a rotation permitting support component preloaded by driving a steering actuator disposed in a tire housing of the vehicle, and
   an electronic control unit (ECU) configured to control the steering actuator; and
   wherein the ECU is configured to control the steering actuator pursuant to a predetermined rule in accordance with vehicle information including a velocity of the vehicle detected and a steering angle of the first steering device so as to control turning angles of the wheels on the left and right sides.

2. The steering system as claimed in claim 1, wherein the ECU is configured to control the steering actuator such that only an outer wheel in turning of the wheels on the left and right sides is turned by an increased amount when the vehicle turns.

3. The steering system as claimed in claim 1, wherein the mechanical section of the second steering device includes:
   a hub unit main body including a hub bearing supporting each of the wheels;
   a unit support member provided to a chassis frame component of a suspension device and supporting the hub unit main body so as to be rotatable about a turning axis extending in a vertical direction; and
   the steering actuator configured to rotationally drive the hub unit main body about the turning axis.

4. The steering system as claimed in claim 1, wherein the ECU is configured to output a current command signal in accordance with a given steering angle command signal, and output a current in accordance with the current command signal so as to drive and control the steering actuator.

5. The steering system as claimed in claim 1, wherein the mechanical section of the second steering device is configured to steer one or both of left and right front wheels and left and right rear wheels.

6. A vehicle comprising the steering system as claimed in claim 1.

* * * * *